United States Patent
Sullivan et al.

[11] Patent Number: 5,857,925
[45] Date of Patent: Jan. 12, 1999

[54] GOLF BALL AND METHOD OF MAKING SAME

[75] Inventors: Michael J. Sullivan, Chicopee; Mark L. Binette, Ludlow; Thomas Kennedy, Wilbraham, all of Mass.; Michelle A. Bellinger, West Hartford, Conn.

[73] Assignee: Lisco, Inc.

[21] Appl. No.: 893,808

[22] Filed: Jul. 11, 1997

[51] Int. Cl.$^6$ .................................................. A63B 37/12
[52] U.S. Cl. ........................ 473/374; 473/373; 473/377; 473/385; 473/384; 526/240
[58] Field of Search .................................. 473/385, 378, 473/373, 374, 377, 384

[56] References Cited

U.S. PATENT DOCUMENTS

| | | | |
|---|---|---|---|
| 2,805,072 | 9/1957 | Smith | 273/235 |
| 2,933,441 | 4/1960 | Mallon | 204/154 |
| 3,572,721 | 3/1971 | Harrison et al. | 372/218 |
| 3,616,101 | 10/1971 | Satchell et la. | 161/7 |
| 3,992,241 | 11/1976 | Ferrari | 156/272 |
| 4,056,421 | 11/1977 | Jarvis | 156/272 |
| 4,185,831 | 1/1980 | Tominaga | 273/235 R |
| 4,419,469 | 12/1983 | Böhm et al. | 524/68 |
| 4,871,589 | 10/1989 | Kitoah et al. | 427/322 |
| 5,000,459 | 3/1991 | Isaach | 273/235 R |
| 5,234,516 | 8/1993 | Okamura et al. | 156/82 |
| 5,286,532 | 2/1994 | Yoshikawa et al. | 427/536 |
| 5,378,531 | 1/1995 | Larson et al. | 428/255 |
| 5,540,876 | 7/1996 | Larson et al. | 264/479 |
| 5,624,332 | 4/1997 | Dalton et al. | 473/354 |
| 5,656,695 | 8/1997 | Endo et al. | 473/385 X |

FOREIGN PATENT DOCUMENTS

| | | | |
|---|---|---|---|
| 650959 | 10/1962 | Canada | 273/40 |
| 911147 | 11/1962 | United Kingdom . | |

*Primary Examiner*—George J. Marlo

[57] ABSTRACT

A golf ball including a core, and a gamma irradiated, ionomeric, dimpled cover having a Shore D hardness of 55 or less as measured on a non-dimpled portion of the cover, the dimples maintaining their shape when the cover is subjected to heat treatment at 160°–180° F. for at least one hour. In making the golf ball, the dimpled cover is subjected to gamma irradiation in a dosage sufficient to increase the vicat softening point in degrees Fahrenheit of the cover by at least 2.5%.

24 Claims, 1 Drawing Sheet

GOLF BALL AND METHOD OF MAKING SAME

BACKGROUND OF THE INVENTION

This invention relates generally to game balls, and more particularly to a game ball, such as a golf ball, having an ionomeric cover.

Before the development of ionomers, balata was the preferred material for golf ball covers. Polyethylene also was proposed for use as a golf ball cover material but was generally deemed highly inferior to balata in imparting playability and durability characteristics to the ball due to its brittleness and high hardness, and thus never became a commercially successful golf ball cover material.

Balata golf ball covers have now been replaced to a great extent by ionomeric cover materials. Ionomers are copolymers of an olefin and an α, β-ethylenically unsaturated carboxylic acid with a portion of the carboxylic acid groups neutralized by a metal ion. The metal ions serve as crosslinking agents, as they are ionically bonded to carboxylic acid groups in adjacent copolymer chains. Instead of having thermally irreversible covalent bonding, ionomers have thermolabile crosslinking in which metal ions become part of the chemical structure of the ionomer upon crosslinking, and these crosslinks are reversible. For purposes of this application, this type of crosslinking is referred to as ionic crosslinking. One of the advantages of ionic crosslinking in golf ball materials is the ability of ionic bonds to re-form after breaking as a result of processing at elevated temperatures.

There are numerous advantages to the use of ionomers in making golf ball covers. On the other hand, one drawback of conventional golf balls with soft ionomeric covers are that the covers are prone to scuffing and cutting, particularly when hit with irons which have sharp grooves. It would be useful to develop a golf ball with a soft ionomeric cover which is highly resistant to cutting and scuffing by sharp-grooved clubs. Furthermore, it would be useful to improve the heat resistance of soft ionomeric golf ball covers without hardening the covers.

SUMMARY OF THE INVENTION

An object of the invention is to provide an ionomeric game ball cover having improved scuff resistance and/or cut resistance.

Another object of the invention is to provide a method for imparting improved scuff resistance and/or cut resistance to a game ball cover.

A further object of the invention is to provide a method of improving the heat resistance of a soft ionomeric golf ball cover.

Yet another object of the invention is to provide a golf ball with a soft cover which is well-suited for use with golf club irons having sharp grooves.

Another object of the invention is to provide a golf ball with a very soft ionomeric cover which has good heat resistance.

Yet another object of the invention is to provide a method of forming a golf ball with a soft cover which has excellent scuff resistance and/or cut resistance.

Other objects will be in part obvious and in part pointed out more in detail hereinafter.

A preferred form of the invention is a golf ball, comprising a core and a gamma irradiated, ionomeric, dimpled cover having a Shore D hardness of 55 or less as measured on a non-dimpled portion of the cover, the dimples maintaining their shape when the cover is subjected to heat treatment at 160°–180° F. for at least one hour.

Another preferred form of the invention is a method of making a golf ball, comprising obtaining a golf ball having a core with a cover formed thereover, the cover having a Shore D hardness of 55 or less as measured on a non-dimpled portion of the cover, and subjecting the cover to gamma irradiation in an amount sufficient to increase the vicat softening point of the cover by at least 1.5% and preferably at least 5%. Preferably, the vicat softening point increases by at least 2° F. and more preferably at least 4° F. as a result of gamma irradiation.

The dimpled cover preferably has a Shore D hardness of 52 or less and more preferably 50 or less. The dimpled cover preferably is formed from a cover material which comprises at least 70 parts by weight of terpolymer ionomer based upon 100 parts by weight of cover material.

The invention accordingly comprises the several steps and the relation of one or more of such steps with respect to each of the others and the article possessing the features, properties, and the relation of elements exemplified in the following detailed disclosure.

DETAILED DESCRIPTION OF THE INVENTION

The game balls in one embodiment of the present invention are surprisingly superior in their scuff (abrasion) resistance and cut resistance to conventional game balls which have not been irradiated, and which contain similar quantities of ionomer and have a similar hardness. Furthermore, the golf balls and other game balls of the invention are comparable in scuff and cut resistance to game balls having non-ionomeric compositions, such as polyurethanes, with similar properties of compression, coefficient of restitution (COR) and hardness. The gamma irradiated golf balls of the present invention are superior in both scuff resistance and heat resistance as compared to untreated golf balls.

The game balls of the invention are formed by first obtaining an uncoated or coated game ball having an ionomeric cover. An "uncoated" game ball as the term is used in this application is a one, two, or multi-piece game ball to which no primer or top coat has been applied over the ionomeric cover. In contrast, a "coated" game ball as this term is used in this application is a ball which has a primer coat and/or a top coat over the ionomeric cover layer. The coated or uncoated game ball of the invention is subjected to irradiation under conditions appropriate to induce covalent crosslinking of the ionomer. This type of direct covalent bonding has been found to take place in ionomeric cover materials when electron beam treatment is applied at a dosage of 2 or more megarads and is expected to also be useful at lower dosages, for example, 1 megarad.

For clarity of description and ease of understanding, the invention will be described in connection with golf balls although it will be understood that other game balls, including but not limited to softballs, basketballs, baseballs, soccer balls, volleyballs, street hockey balls, footballs, and the like, can advantageously employ the features of the present invention.

Figure 1:
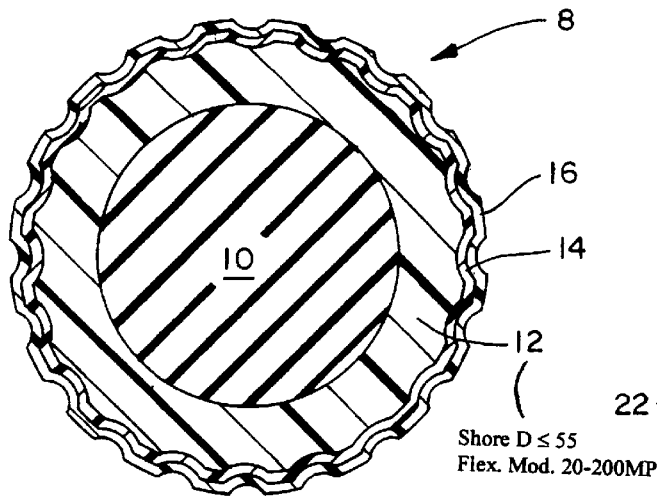
FIG. 1. shows a golf ball according to the present invention.

Referring now to the drawings, and in particular to FIG. 1, a golf ball according to the present invention is shown and is designated as 8. The ball has a core 10, which is solid, or is formed from any other suitable type of core composition. An ionomeric cover 12 surrounds the core 10. A thin primer coat 14 is applied to the outer surface of cover 12. A thin top coat 16 surrounds the primer coat 14. The thicknesses of primer coat 14 and top coat 16 are exaggerated for illustrative purposes.

In accordance with the present invention, after the cover layer 12 is applied over the core, the cover layer 12 is subjected to irradiation at a dose of about 1 or more megarads in order to covalently crosslink the ionomeric cover material. When electron beam treatment is used, particularly good results are obtained when the dosage is 2–12 megarads. In a most preferred form of the invention, a dosage of 4–8 megarads is utilized. As used herein, the term "irradiation" refers to short-duration irradiation using an electron beam or the like, rather than to mere exposure to sunlight, which would result in a dosage of well below 1 megarad. Irradiation takes place at a temperature below the melting or deformation temperature of the cover layer, and for convenience preferably takes place at ambient temperature.

The cover 12 can be irradiated prior to or after application of primer coat 14 and top coat 16. Furthermore, primer coat 14 can be eliminated if adhesion of top coat 16 to cover 12 is sufficient to render the ball suitable for competitive play, as is commonly the case with softballs and baseballs, and may also be the case for other game balls.

The game ball of the invention can be irradiated with electrons, neutrons, protons, gamma rays, x-rays, helium nuclei, or the like. In a particularly preferred form of the invention, the scuff and cut resistance of cover 12 is enhanced by subjecting the cover to electron beam treatment at a dosage sufficient to significantly improve scuff resistance and COR without excessively hardening the compression. The game ball preferably obtains an improvement in COR of at least 0.5% as a result of irradiation of the cover.

The cover composition preferably contains high quantities of ionomer. Thus, the irradiated cover material has a combination of ionic crosslinks and covalent crosslinks. Particularly preferred ionomers or ionomer blends include ionic copolymers containing an olefin, an unsaturated carboxylic acid, and an acrylate. Such polymers typically, although not necessarily, have a Shore D hardness in the range of 20–60. Non-ionomeric materials can be blended with the ionomer as long as an acceptable increase in scuff resistance and/or cut resistance is obtained as a result of covalent crosslinking of the ionomer. Nonlimiting examples of materials to be blended with an ionomer include ethylene-ethyl acrylate, ethylene-methyl acrylate, ethylene-vinyl acetate, low density polyethylene, linear low density polyethylene, metallocene catalyzed polyolefins such as ENGAGE polyolefins available from Dow Chemical and EXACT polyolefins available from Exxon, non-ionomeric acid copolymers such as PRIMACOR, available from Dow Chemical, and NUCREL, available from Du Pont, and a variety of thermoplastic elastomers, including KRATON, available from Shell, SANTOPRENE, available from Monsanto, and HYTREL, available from DuPont, etc. Furthermore functionalized EPDM, such as maleated EPDM, nylon, and nylon-ionomer graft copolymers can be blended with the ionomer. A soft, dimpled cover layer which is to be gamma treated preferably is formed from a cover material which has a flex modulus of 20–200 MPa, preferably 20–150 Mpa, and more preferably 20–100 MPa. When a blend of hard and soft ionomers is used, the weight ratio of hard to soft ionomer is generally in the range of 5:95 to 30:70.

If the game ball cover is irradiated prior to application of a primer coat 14 and/or top coat 16, there is no particular restriction on the type of primer coat and/or top coat to be used. If irradiation occurs after application of a primer coat and/or a top coat over the cover 12, it is important to ensure that the radiation will penetrate the coating and that the dosage of radiation is sufficient to covalently crosslink the cover material without adversely affecting the properties of the primer and/or top coat to a substantial degree. Due to the thinness of the primer coat and top coat on most game balls, including golf balls, it has been found that little change in radiation dosage is required if irradiation occurs after application of such coatings.

Golf balls according to the invention preferably have a post-irradiation PGA compression of 10–110. In a particularly preferred form of the invention, the golf balls have a PGA compression of about 40–100 after irradiation. It has been found that excellent results are obtained when the post-irradiation PGA compression of the golf balls is 60–100. The irradiation method of the invention preferably results in an increase in PGA compression of at least 5% as compared to the PGA compression of the ball prior to treatment. The coefficient of restitution of the golf balls of the invention after treatment is in the range of 0.770 or greater. Preferably, the COR of the golf balls is in the range of 0.790–0.830 and most preferably 0.800–0.830. The Shore D hardness of the golf balls of the invention after irradiation is in the range of 35–80. Particularly good results are obtained when the Shore D hardness of the golf balls is in the range of 50–70, and most preferably 50–60. In this application, Shore D hardness of a cover is measured generally in accordance with ASTM D-2240, except the measurements are made on the curved surface of a molded cover, rather than on a plaque. Furthermore, the Shore D hardness of the cover is measured while the cover remains over the core. When a hardness measurement is made on a dimpled cover, Shore D hardness is measured at a land area of the dimpled cover.

The invention is particularly well suited for use in making dimpled, pebbled, and other game balls which do not have a smooth outer surface, including game balls with simulated stitching. A smooth ball is less susceptible to scuffing than a dimpled ball since dimples give the golf club groove a sharp-edged surface to "catch." Pebbles clearly are susceptible to shearing when dribbled on a hard surface, or the like. Likewise on a molded-cover softball, the stitching is a raised area that will be sheared or compressed more than the smooth-surfaced area by a bat and/or by the turf, dirt, etc.

Figure 2:
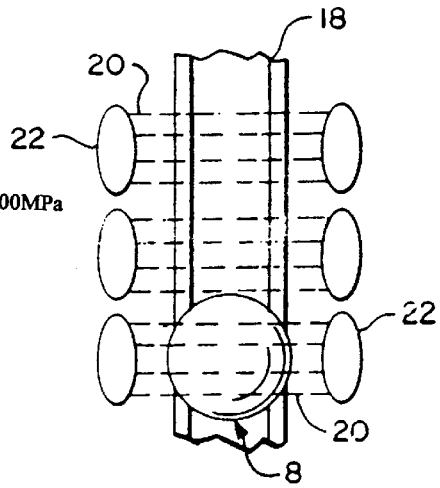
FIGS. 2–3 schematically show one embodiment for practicing the method of the invention.
Figure 3:
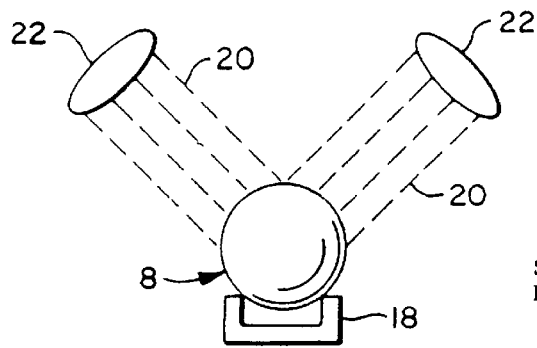

One embodiment of a method for electron beam treating golf balls according to the invention can be described in connection with FIGS. 2 and 3. The golf ball 8 is placed on a channel 18 along which it slowly moves. Electrons 20 from electron beam lamps 22 contact the surface of the ball 8. The lamps are positioned to provide a generally uniform dose of radiation on the entire surface of the ball as the ball rolls along the channel 18. Preferably, the balls are irradiated with an electron beam dosage of 1 or more megarads, more preferably 2–12 megarads. The intensity of the dosage preferably is in the range of 1–20 MeV.

The golf balls of the invention are found to exhibit a post-treatment scuff resistance in the range of 1–3 on a scale of 1–4. It is preferred that the treatment be appropriate to provide the golf balls with a scuff resistance of 1–2.5, and more preferably 1–2. Golf balls according to the invention have a cut resistance in the range of 1–3 on a scale of 1–5. It is preferred that the golf balls of the invention have a cut resistance of 1–2.5 and most preferably 1–2.

The scuff resistance test was conducted in the following manner: a Top-Flite Tour pitching wedge (1994) with box grooves was obtained and was mounted in a Miyamae driving machine. The club face was oriented for a square hit. The forward/backward tee position was adjusted so that the tee was four inches behind the point in the downswing where the club was vertical. The height of the tee and the toe-heel position of the club relative to the tee were adjusted in order that the center of the impact mark was about ¾ of an inch above the sole and was centered toe to heel across the face. The machine was operated at a clubhead speed of 125 feet per second. Three samples of each ball were tested. Each ball was hit three times. After testing, the balls were rated according to the following table:

| Rating | Type of damage |
|---|---|
| 1 | Little or no damage (groove markings or dents) |
| 2 | Small cuts and/or ripples in cover |
| 3 | Moderate amount of material lifted from ball surface but still attached to ball |
| 4 | Material removed or barely attached |

Cut resistance was measured in accordance with the following procedure: A golf ball was fired at 135 feet per second against the leading edge of a 1994 Top-Flite Tour pitching wedge, wherein the leading edge radius is $\frac{1}{32}$ inch, the loft angle is 51 degrees, the sole radius is 2.5 inches, and the bounce angle is 7 degrees.

The cut resistance of the balls tested herein was evaluated on a scale of 1–5. A 5 represents a cut that extends completely through the cover to the core; a 4 represents a cut that does not extend completely through the cover but that does break the surface; a 3 does not break the surface of the cover but does leave a permanent dent; a 2 leaves only a slight crease which is permanent but not as severe as 3; and a 1 represents virtually no visible indentation or damage of any sort.

It has been found that golf balls which are treated according to the irradiation technique of the present invention exhibit a particular improvement in scuff and/or cut resistance. This improvement is particularly significant when the golf balls are struck with a square-grooved iron. It is has been found that square-grooved irons and other sharp-grooved irons tend to abrade and damage golf ball covers more readily than irons having "V-type" grooves.

Figure 4:
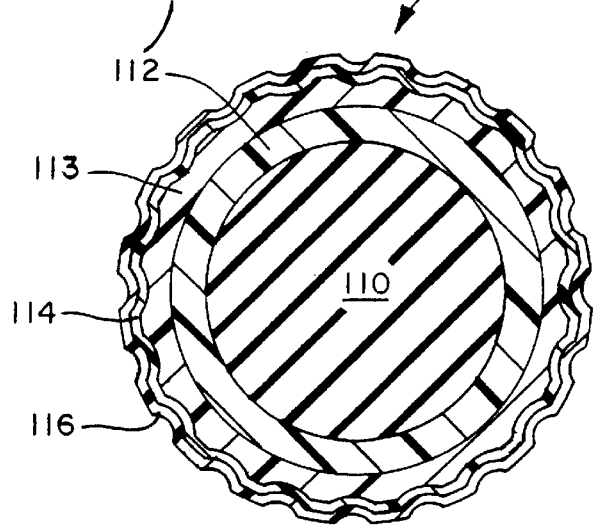
FIG. 4 shows a second embodiment of a golf ball according to the present invention.

FIG. 4 shows a further preferred embodiment of the invention. The golf ball, which is designated as 108, has a central core 110, which is a solid, or is formed from any other suitable type of core composition. An ionomeric inner cover layer 112 surrounds the core 110. An ionomeric outer cover layer 113 surrounds the inner cover layer 112. A thin primer coat 114 is applied to the outer surface of cover 113. A thin top coat 116 surrounds the primer coat 114. The thicknesses of primer coat 114 and top coat 116 are exaggerated for illustrative purposes. Particular advantages result from gamma irradiation of an ionomeric golf ball which has a very soft outer cover 114. Any noticeable loss in dimple depth due to heat exposure is unacceptable, and gamma treatment can prevent such a loss. Gamma irradiation is particularly advantageous when the outer cover layer has a plaque Shore D hardness (ASTM D-2240) in the range of 30–55, more preferably 35–50, and most preferably 40–50. It has been found that the heat resistance of such an outer cover can be increased by gamma irradiation, and scuff resistance can be improved. More particularly, the vicat softening point (ASTM D1525) of a soft outer cover layer, as measured in degrees F. can be increased by at least 2.5%, preferably 5–10%, and most preferably 10% or more as a result of gamma irradiation. This enables the soft covered golf balls to withstand prolonged exposure to heat during use or storage.

Soft covered golf balls preferably are gamma treated at a dosage of 1 to 10 Mrads, more preferably 2–7 Mrads, and most preferably 3.5–7.0 Mrads (1 Mrad=10 kilograys). This degree of irradiation generally results in an increase in the vicat softening point of the cover of 2–11 degrees, more preferably 4–11 degrees, and most preferably 6–11 degrees, respectively.

When golf balls are irradiated at the dosages indicated above, the PGA compression and coefficient of restitution of the balls will increase. Typically, the PGA compression of a ball will increase on the order of about 1–20 points, and the coefficient of restitution will increase in an amount of about 1–30 points.

Having generally described the invention, the following examples are included for purposes of illustration so that the invention may be more readily understood and are in no way intended to limit the scope of the invention unless otherwise specifically indicated.

EXAMPLE 1

Polybutadiene golf ball cores having an average coefficient of restitution (COR) of 0.790 and a PGA compression of 90 were obtained. The cores were covered with a relatively soft, 0.055 inch thick cover formed from an ionomeric composition, designated as ionomer 1, which includes a blend of a hard sodium ionomer and a soft zinc ionomer. Pigments and an optical brightener were also included in the cover composition. The hard ionomer is a copolymer containing two monomer types, namely an α-olefin and an acrylic-type carboxylic acid. The soft ionomer is a copolymer which contains three types of monomers, namely an α-olefin, an acrylic-type carboxylic acid, and an acrylate. The cover was formed over the core. The balls were primed with a polyurethane-based primer with a thickness of about 0.5 thousandths of an inch and coated with a polyurethane top coat with a thickness of about 0.5 thousandths of an inch. The properties of these balls prior to electron beam treatment are shown on Table 1.

A portion of the balls were subjected to electron beam treatment at dosages of 2, 4, 6, 8 and 11 megarads at an energy level of 10 MeV. Changes in the properties of the balls are shown on Table 1.

As indicated on Table 1, the scuff resistance of the golf balls substantially improved between electron beam dosages of 2 and 6 megarads. The cut resistance of the balls improved between electron beam dosages of 6 and 8 megarads. Meanwhile, the change in Shore D hardness in the dosage range of 2 to 8 was only 1.

EXAMPLE 2

Golf ball cores having an average PGA compression of 85 and an average COR of 0.800 were obtained. The cores were covered with a hard zinc-sodium ionomeric cover composition containing two monomer types, namely an α-olefin and a carboxylic acid. The initial properties of the covered cores prior to priming and finish coating are shown on Table 1.

A portion of the golf balls were primed with the same polyurethane-based primer as was used in Example 1 and then coated with the same polyurethane top coat as was used in Example 1. Subsequently, a portion of both the unprimed and unfinished golf balls and the primed and finished golf balls were subjected to electron beam treatment in the dosages shown on Table 1. Properties of compression, COR, Shore D hardness and scuff resistance are shown on Table 1.

As indicated in Table 1, the scuff resistance of the finished golf balls increased substantially while resulting in a minimal increase in Shore D hardness.

TABLE 1

| Cover Material | Dosage (Megarads) | Weight | PGA Comp. | COR | Shore D | Scuff Resistance | Cut Resistance |
| --- | --- | --- | --- | --- | --- | --- | --- |
| Ionomer Blend 1 (coated prior to treatment) | 2.0 | 45.5 | 93 | .788 | 54 | 2.5 | 2–3 |
|  | 4.0 | 45.5 | 97 | .797 | 55 | 1–2 | 2–3 |
|  | 6.0 | 45.5 | 98 | .795 | 55 | 1.5 | 2–3 |
|  | 8.0 | 45.5 | 98 | .797 | 55 | 1.5 | 2 |
|  | 11.0 | 45.5 | 101 | .802 | 55 | 1.5 | 2 |
|  | 0 | 45.5 | 92 | .787 | 54 | 3.5 | 3 |
| Ionomer Blend 2 (uncoated) | 2.0 | 45.4 | 96 | .822 | 63 | — | — |
|  | 4.0 | 45.4 | 97 | .822 | 63 | — | — |
|  | 0 | 45.4 | 88 | .812 | 62 | — | — |
| Ionomer Blend 2 (coated with primer and top coat prior to treatment) | 6.0 | 45.5 | 101 | .829 | 64 | 1.5 | 1–2 |
|  | 8.0 | 45.5 | 103 | .828 | 64 | 1.5 | 1–2 |
|  | 0 | 45.5 | 88 | .813 | 63 | 2.0 | 1–2 |

EXAMPLE 3

Five dozen golf balls having a solid core, a hard inner cover layer and a soft outer cover layer were gamma irradiated at 7.5 Mrads. Five dozen golf balls having the same core and cover compositions were gamma irradiated at 5.0 Mrads. The ten dozen gamma irradiated golf balls and a set of untreated control balls having the same core and cover compositions were heat treated at 170° F. for 48 hours. The dimpled cover of the non-irradiated control balls became generally smooth as a result of heat treatment. The gamma treated golf balls maintained a dimpled outer cover. The formulations and physical properties of the golf balls are shown below on Tables 2 and 3. Masterbatch B contains 75.35 wt % Iotek 7030, 23.9 wt % Unitane 110, 0.46 wt. % ultramarine blue, 0.26 wt % Eastobrite OB1 optical brightener and 0.038 wt % Santanox R.

TABLE 2

Golf Ball Formulation

| Material | phr |
| --- | --- |
| Core Formulation | |
| BR 1220 (high-cis polybutadiene) | 70 |
| Taktene 220 (high-cis polybutadiene) | 30 |
| Zinc Oxide | 31.5 |
| Core Regrind | 16 |
| Zinc Stearate | 16 |
| Zinc diacrylate | 20 |
| Masterbatch A | 0.15 |
| 231 XL Peroxide | 0.9 |
| Inner Cover Layer | |
| Iotek 1002 | 50 |
| Iotek 1003 | 50 |
| Outer Cover Layer | |
| Iotek 8000 | 8.5 |
| Iotek 7510 | 41 |
| Iotek 7520 | 41 |
| Masterbatch B | 9.5 |

TABLE 3

Golf Ball Properties

| | Untreated | Gamma treated at 5.0 Mrad | Gamma treated at 7.5 Mrad |
| --- | --- | --- | --- |
| Golf Balls: | | | |
| Ball dia. (in.) | 1.68 | 1.68 | 1.68 |
| Weight (g.) | 45.7 | 45.7 | 45.9 |
| PGA Comp | 83 | 95 | 99 |
| COR (x 1000) | 776 | 789 | 791 |
| Shore C/D | 75–76/48–49 | 76/49 | 76–77/50 |

As shown by the results on Tables 2 and 3, gamma irradiation increased the COR and PGA compression of the golf balls while having little, if any, effect on Shore D hardness. Heat resistance improved significantly as a result of gamma irradiation.

EXAMPLE 4

Golf ball cores having the properties shown below on Table 4 were prepared. The balls were then covered with an inner cover layer made from 50 parts by weight of an Exxon ionomer designated as EX 1002 and 50 parts by weight of an Exxon ionomer designated as EX 1003. The inner covers were then covered by an outer cover layer formed from 8.5 parts by weight of Iotek 8000, 41 parts by weight of Iotek 7510, 41 parts by weight of Iotek 7520, and 9.5 parts by weight of masterbatch B, which is the same as was used in Example 3. A number of the balls were subjected to gamma irradiation at either 3.5 Mrads or 7.0 Mrads. The PGA compression and coefficient of restitution of the treated and untreated balls were measured. The results are shown on Table 4 below.

In this Example, cold cracking resistance is measured by firing a ball, having been previously stored at 10° F. for 24 hours, at a velocity of 165 ft/sec from an air cannon against a steel plate positioned 12 feet from the muzzle of the cannon. The ball is fired 5 times against the plate. After allowing the ball to equilibrate to room temperature, the ball is visually inspected to identify cracks in the cover. One or more cracks, no matter how small, constitute failure.

The spin rate of the golf ball is measured by striking the ball with a 9-iron using a driving machine wherein the club-head speed is about 105 feet per second and the ball is launched at an angle of 26 to 34 degrees with an initial velocity of about 110–115 feet per second. The spin is measured by observing the rotation of the ball in flight using stop action strobe photography. The test resulted in a spin rate of 9029 for a 1996 Strata Tour golf ball and 9495 for a Titleist Tour Balata 100.

As shown on Table 4, PGA compression and COR increased generally the same amount for balls with hard and soft cores. Spin increased as the dosage of gamma irradiation increased. This is because the core hardens as a result of gamma treatment, causing the cover to be "pinched" more when hit by a club. Scuff resistance improved slightly or remained the same as a result of gamma treatment.

TABLE 4

| EXAMPLE NO. | 4-1 | 4-2 | 4-3 | 4-4 | 4-5 |
|---|---|---|---|---|---|
| Core Data |  |  |  |  |  |
| Size (in.) | 1.472 | 1.475 | 1.474 |  |  |
| Weight (g.) | 32.7 | 32.4 | 32.6 |  |  |
| PGA Comp | 55 | 32 | 23 |  |  |
| COR (x 1000) | 769 | 752 | 749 |  |  |
| Mantle Data |  |  |  |  |  |
| Size. (in.) | 1.57 | 1.57 | 1.57 |  |  |
| PGA Comp | 94 | 101 | 113 |  |  |
| COR (x 1000) | 795 | 790 | 782 |  |  |
| Ball Data |  |  |  |  |  |
| Retain PGA Comp | 79 | 73 | 64 | 81 | 79 |
| Retain COR (x 1000) | 785 | 780 | 774 | 803 | 802 |
| 3.5 Mrad PGA Comp | 86 | 80 | 73 | 92 | 88 |
| 3.5 Mrad COR (x 1000) | 796 | 790 | 784 | 813 | 810 |
| 7.0 Mrad PGA Comp | 94 | 86 | 79 | — | — |
| 7.0 Mrad COR (x 1000) | 803 | 794 | 788 | — | — |
| Cold Crack | NF[1] | NF | NF | — | — |
| Wet Barrel | NF | NF | NF | — | — |
| Spin[2] - retain | 8598 | 8437 | 8222 |  |  |
| 3.5 Mrad | 9170 | 8671 | 8560 |  |  |
| 7.0 Mrad | 9475 | 9054 | 8870 |  |  |
| Scuff - retain | 3.5 | 3.5 | 2.5 |  |  |
| 3.5 Mrad | 3.0 | 2.5–3 | 2.5 |  |  |
| 7.0 Mrad | 3.0–3.5 | 2.5 | 2.5 |  |  |

[1]no failures
[2]controls: Strata Tour 90-9029; Titleist TB100-9495

EXAMPLE 5

Golf balls having a blow molded ionomeric core of 50 parts by weight Iotek 1002 and 50 parts by weight Iotek 1003 which were filled with a solution of calcium chloride and water were covered with one of three different cover formulations, shown below on Table 5.

One group of the balls was gamma treated at 3.5 Mrads and another group was gamma treated at 7.0 Mrads. The PGA compression and the COR of the gamma treated balls were measured and compared with the untreated controls. The gamma treatment had little effect on the compression and COR of the balls, as is shown on Table 6 below.

TABLE 5

| Cover Formulation | A parts | B parts | C parts |
|---|---|---|---|
| Iotek 1006 | 2265 |  |  |
| Iotek 1007 | 2265 |  |  |
| Masterbatch B | 470 | 9.5 | 9.4 |
| Surlyn 8940 |  | 16.4 |  |
| Surlyn 9910 |  | 49.4 |  |
| Surlyn 8120 |  | 7.5 |  |
| Surlyn 8320 |  | 17.2 |  |
| Iotek 7510 |  |  | 57.5 |
| Iotek 8000 |  |  | 33.1 |

TABLE 6

|  | Ball size (in.) | PGA Comp. | COR (x 1000) |
|---|---|---|---|
| Cover A |  |  |  |
| retain | 1.675 | 112 | 760 |
| 3.5 Mrads | 1.676 | 113 | 760 |
| 7.0 Mrads | 1.676 | 113 | 756 |
| Cover B |  |  |  |
| retain | 1.675 | 106 | 739 |
| 3.5 Mrads | — | — | — |
| 7.0 Mrads | — | 107 | 737 |
| Cover C |  |  |  |
| retain | 1.676 | 95 | 722 |
| 3.5 Mrads | — | — | — |
| 7.0 Mrads | 1.676 | 98 | 718 |

EXAMPLE 6

A number of golf balls were formed using outer cover layers comprising blends of functionalized EPDM with ionomer terpolymers. The cover formulations are shown on Tables 7–8 below.

As shown by Examples 6-3 and 6-5, when maleated EPDM thermoplastic elastomer is blended with soft ionomer, an improvement in scuff resistance results. Gamma treatment appeared to provide for some improvements in heat resistance for all of the balls.

TABLE 7

| MATERIALS | Pre-extrude Blend ratio | 6-1 | 6-2 | 6-3 | 6-4 | 6-5 | 6-6 | 6-7 |
|---|---|---|---|---|---|---|---|---|
| Iotek 7510[1]/EPDM-MA[2] (Royaltuf 465) | 85/15 |  |  | 90% |  |  |  |  |
| Iotek 7520[3]/EPDM-MA (Royaltuf 465) | 85/15 |  |  |  |  | 90% |  |  |
| Iotek 7510/EPDM-SO3-Zn2+[4] | 85/15 |  |  |  |  |  | 90% |  |
| Iotek 7510/EPDM-SAN[5] (Royaltuf 465) | 85/15 |  |  |  |  |  |  | 90% |
| ATX325-Li-50[6]/EPDM-MA (Royaltuf 465) | 85/15 |  |  |  | 90% |  |  |  |
| Control X[7] |  | 100% |  |  |  |  |  |  |
| Control Y[8] |  |  | 100% |  |  |  |  |  |
| Masterbatch B |  |  |  | 10% | 10% | 10% | 10% | 10% |

TABLE 7-continued

| MATERIALS | Pre-extrude Blend ratio | 6-1 | 6-2 | 6-3 | 6-4 | 6-5 | 6-6 | 6-7 |
|---|---|---|---|---|---|---|---|---|
| FINISHED PROPERTIES | | | | | | | | |
| 6 balls | | | | | | | | |
| Size (in.) | | 1.685 | 1.685 | 1.684 | 1.686 | 1.686 | n | 1.685 |
| Weight (g.) | | 45.61 | 45.6 | 45.57 | 45.57 | 45.59 | o | 45.7 |
| PGA Compression | | 82 | 85 | 82 | 78 | 79 | | 80 |
| COR | | 791 | 796 | 789 | 784 | 788 | g | 790 |
| Cold Crack | | NF | NF | NF | NF | NF | o | NF |
| Durability - 300 blows | | NF | NF | NF | NF | 1 @ 300 | o | NF |
| GAMMA TREATMENT | | | | | | | | |
| COR gain | | | | | | | | |
| Retains | | 0 | 2 | 1 | 1 | 2 | | 3 |
| 3.5 Mrad | | 12 | 12 | 12 | 12 | 11 | | 16 |
| 7.0 Mrad | | 17 | 15 | 14 | 14 | 18 | | 17 |
| PGA Compression gain | | | | | | | | |
| Retains | | 4 | 5 | 5 | 4 | 4 | | 3 |
| 3.5 Mrad | | 14 | 14 | 14 | 14 | 15 | | 15 |
| 7.0 Mrad | | 19 | 16 | 20 | 18 | 19 | | 19 |
| Shore D Hardness | | | | | | | | |
| Retains | | 49 | 59 | 46 | 50 | 45 | | 50 |
| 3.5 Mrad | | 50 | 60 | 47 | 51 | 46 | | 50 |
| 7.0 Mrad | | 50 | 61 | 49 | 51 | 46 | | 51 |
| Scuff Resistance | | | | | | | | |
| Retains | | 3 | 3.5 | 1.5 | 1.5 | 2 | | 2.5 |
| 3.5 Mrad | | 2.5 | 3.5 | 1.5 | 2 | 1.5 | | 3 |
| 7.0 Mrad | | 2.5 | 3.5 | 1–1.5 | 1.5 | 1–1.5 | | 2.5 |
| HEAT RESISTANCE[9] | | | | | | | | |
| 170° F. for 10 hours | | | | | | | | |
| Retains | | 0 | 2 | 0 | 0 | 2 | — | 0 |
| 3.5 Mrad | | 1 | 3 | 1 | 1 | 2 | — | 1 |
| 7.0 Mrad | | 2 | 3 | 2 | 2 | 3 | — | 2 |
| 180° F. for 10 hours | | | | | | | | |
| Retains | | 0 | 2 | 1 | 0 | 2 | — | 1 |
| 3.5 Mrad | | 2 | 4 | 2 | 2 | 3 | — | 2 |
| 7.0 Mrad | | 4 | 5 | 3 | 3 | 5 | — | 4 |

[1] ionomer from Exxon Chem. Corp.
[2] maleated EPDM from Uniroyal
[3] ionomer from Exxon Chem. Corp.
[4] sulfonated EPDM
[5] styrene acrylonitrile grafted EPDM from Uniroyal
[6] ionomer from Exxon Chem. Corp.
[7] soft ionomer blend
[8] soft ionomer blend
[9] 10 = excellent (dimples fully retained), 0 = poor (dimples disappear); scale was different for 170° and 180° F. treated balls

TABLE 8

| | Pre-extrude Blend ratio | 6–8 | 6–9 | 6–10 |
|---|---|---|---|---|
| MATERIALS | | | | |
| Iotek 7510/EPDM-MA (Royaltuf 490) | 85/15 | 90% | | |
| Iotek 7510/EPDM-MA (Royaltuf 490) | 70/30 | | 90% | |
| Iotek 7510/EPDM-MA (Royaltuf 490) | 55/45 | | | 90% |
| Masterbatch B | | 10% | 10% | 10% |
| FINISHED PROPERTIES - 6 balls | | | | |
| Size (in.) | | 1.686 | 1.687 | 1.689 |
| Weight (g.) | | 45.48 | 45.35 | 45.27 |
| PGA Compression | | 82 | 81 | 79 |
| COR | | 785 | 784 | 781 |
| Cold Crack | | NF | NF | NF |
| Durability - 300 blows | | 1 @ 300 | 2 @ 300 | NF |
| GAMMA TREATMENT | | | | |
| COR gain | | | | |
| Retains | | 1 | 0 | 1 |
| 3.5 Mrad | | 11 | 15 | 13 |
| 7.0 Mrad | | 17 | 20 | 16 |
| PGA Compression loss | | | | |
| Retains | | 5 | 5 | 6 |
| 3.5 Mrad | | 15 | 17 | 16 |
| 7.0 Mrad | | 21 | 23 | 22 |

TABLE 8-continued

| | Pre-extrude Blend ratio | 6–8 | 6–9 | 6–10 |
|---|---|---|---|---|
| Shore D Hardness | | | | |
| Retains | | 46 | 45 | 45 |
| 3.5 Mrad | | 47 | 46 | 46 |
| 7.0 Mrad | | 47 | 46 | 46 |
| Scuff Resistance | | | | |
| Retains | | 2 | 2 | 1.5 |
| 3.5 Mrad | | 2 | 1.5 | 2.5 |
| 7.0 Mrad | | 2 | 2 | |
| HEAT RESISTANCE[1] | | | | |
| 170° F. for 10 hours | | | | |
| Retains | | 0 | 1 | 1 |
| 3.5 Mrad | | 1 | 2 | 2 |
| 7.0 Mrad | | 1 | 2 | 3 |
| 180° F. for 10 hours | | | | |
| Retains | | 1 | 1 | 2 |
| 3.5 Mrad | | 2 | 2 | 4 |
| 7.0 Mrad | | 4 | 4 | 4 |

[1]10 = excellent (dimples fully retained), 0 = poor (dimples disappear); scale was different for 170° and 180° F. treated balls As will be apparent to persons skilled in the art, various modifications and adaptations of the structure above described will become readily apparent without departure from the spirit and scope of the invention, the scope of which is defined in the appended claims.

We claim:

1. A golf ball comprising,
   a core, and
   a gamma irradiated, ionomeric, dimpled cover having a Shore D hardness of 55 or less as measured on a non-dimpled portion of the cover, the dimples maintaining their shape when the cover is subjected to heat treatment at 160°–180° F. for at least one hour.

2. A golf ball according to claim 1, wherein the dimpled cover has a Shore D hardness of 52 or less.

3. A golf ball according to claims 1, wherein the dimpled cover has a Shore D hardness of 50 or less.

4. A golf ball according to claim 1, wherein the dimpled cover is formed from a cover material comprising at least 70 parts by weight of terpolymer ionomer based upon 100 parts by weight of cover material.

5. A golf ball according to claim 1, wherein the dimpled cover comprises a blend of hard and soft ionomers.

6. A golf ball according to claim 5, wherein the ratio of hard to soft ionomer is in the range of 5:95 to 30:70.

7. A golf ball according to claim 1, wherein the dimpled cover is formed from a cover material having a flex modulus in the range of 20–100 MPa.

8. A golf ball according to claim 1, wherein the dimpled cover is formed directly over the core.

9. A golf ball according to claim 1, wherein the ball has an inner cover beneath the dimpled cover.

10. A golf ball according to claim 1, wherein the ball has an inner cover and an intermediate cover beneath the dimpled cover.

11. A golf ball according to claim 1, wherein the cover comprises a blend of ionomer and EPDM.

12. A golf ball according to claim 11, wherein the EPDM is maleated.

13. A golf ball according to claim 9, wherein the dimpled cover has a Shore D hardness of 52 or less.

14. A golf ball according to claim 10, wherein the dimpled cover has a Shore D hardness of 52 or less.

15. A golf ball according to claim 9, wherein the dimpled cover has a Shore D hardness of 50 or less.

16. A golf ball according to claim 10, wherein the dimpled cover has a Shore D hardness of 50 or less.

17. A method of making a golf ball, comprising:
    obtaining a golf ball having a core and having a dimpled cover with a Shore D hardness of 55 or less as measured on a non-dimpled portion of the cover, and
    subjecting the dimpled cover to gamma irradiation in a dosage sufficient to increase the vicat softening point in degrees Fahrenheit of the cover by at least 2.5%.

18. A method according to claim 17, wherein the dimpled cover is subjected to gamma irradiation in a dosage sufficient to increase the vicat softening point in degrees Fahrenheit of the cover by at least 5%.

19. A method of making a golf ball according to claim 17, wherein the dimpled cover has a Shore D hardness of 52 or less.

20. A method of making a golf ball according to claim 17, wherein the dimpled cover has a Shore D hardness of 50 or less.

21. A method of making a golf ball according to claim 17, wherein the dimpled cover is formed from a cover material comprising at least 70 parts by weight of terpolymer ionomer based upon 100 parts by weight of cover material.

22. A method of making a golf ball according to claim 17, wherein the dimpled cover comprises a blend of hard and soft ionomers.

23. A method of making a golf ball according to claim 17, wherein the dimpled cover is subjected to gamma irradiation in a dosage sufficient to increase the vicat softening point of the cover by at least 2° F.

24. A method of making a golf ball according to claim 17, wherein the dimpled cover is subjected to gamma irradiation in a dosage sufficient to increase the vicat softening point of the cover by at least 4° F.

* * * * *